(12) United States Patent
Ptak et al.

(10) Patent No.: US 8,343,251 B2
(45) Date of Patent: Jan. 1, 2013

(54) COMPOSITE FILTER MEDIA

(75) Inventors: Thaddeus J. Ptak, Canal Winchester, OH (US); Russell Baldinger, Laurelville, OH (US)

(73) Assignee: Columbus Industries, Inc., Ashville, OH (US)

( * ) Notice: Subject to any disclaimer, the term of this patent is extended or adjusted under 35 U.S.C. 154(b) by 311 days.

(21) Appl. No.: 12/102,434

(22) Filed: Apr. 14, 2008

(65) Prior Publication Data

US 2009/0255404 A1    Oct. 15, 2009

(51) Int. Cl.
*B01D 46/00*    (2006.01)

(52) U.S. Cl. ............ 55/486; 55/487; 55/499; 55/DIG. 5

(58) Field of Classification Search ............ 55/486, 55/487, 488, 489, 499, 501, DIG. 5
See application file for complete search history.

(56) References Cited

U.S. PATENT DOCUMENTS

| | | | | | |
|---|---|---|---|---|---|
| 4,073,732 | A | * | 2/1978 | Lauer et al. | 210/491 |
| 4,478,620 | A | * | 10/1984 | Tamura | 55/486 |
| 5,704,953 | A | * | 1/1998 | Stemmer | 55/483 |
| 5,817,168 | A | * | 10/1998 | Wheless | 96/222 |
| 5,874,052 | A | * | 2/1999 | Holland | 422/171 |
| 5,922,096 | A | * | 7/1999 | Stemmer | 55/483 |
| 6,524,360 | B2 | * | 2/2003 | Cox et al. | 55/382 |
| 6,808,553 | B2 | * | 10/2004 | Kawano et al. | 95/287 |
| 2002/0184863 | A1 | * | 12/2002 | Bergami | 55/486 |
| 2003/0005669 | A1 | * | 1/2003 | Maeoka et al. | 55/486 |
| 2003/0094102 | A1 | * | 5/2003 | Maeoka et al. | 96/226 |
| 2005/0132682 | A1 | * | 6/2005 | Paul | 55/486 |
| 2006/0060085 | A1 | | 3/2006 | Ptak et al. | |
| 2009/0056548 | A1 | * | 3/2009 | Woo et al. | 95/287 |

* cited by examiner

*Primary Examiner* — Robert Clemente
(74) *Attorney, Agent, or Firm* — Jason H. Foster; Kremblas & Foster

(57) ABSTRACT

A composite filter media having excellent dust-releasing properties provided with a layer of netting formed of a low surface free energy material that is hot calendered to the upstream surface of a supporting layer formed of non-woven synthetic fibers. A filtering layer formed of non-woven synthetic fibers is laminated to the downstream surface of the supporting layer. The filtering layer may include an electrostatic charge to increase filter efficiency at a reduced pressure drop across the composite media.

29 Claims, 2 Drawing Sheets

COMPOSITE FILTER MEDIA

BACKGROUND OF THE INVENTION

1. Field of the Invention

This invention relates generally to air filter media and more particularly to a composite air filter media that incorporates a layer of low surface free energy netting laminated to its upstream surface for improved dust-releasing properties.

2. Description of the Related Art

Modern air filter media used in vacuum cleaners and portable air cleaner applications are typically constructed from expanded microporous membranes such as polytetraflouroethylene (PTFE), or non-woven meltblown synthetic fibers that are calendered and coated with hydrophobic material. These media are preferred for their ability to be effectively regenerated by shaking and/or tapping the filter unit's frame against a solid surface, or by vacuuming the upstream surface of the filter, for example. The PTFE surface free energy is relatively low, in the range of 20 mN/m, as is the hydrophobic (fluorochemically) coated material (22-24 mN/m), which enhances removal of particles during regeneration.

Filters made from expanded microporous membranes or meltblown fibers treated with hydrophobic material, however, are expensive, exhibit high pressure drops, and have upstream surfaces that are susceptible to abrasion as compared to other types of paper media or synthetic non-woven fiber media. It would therefore be advantageous to have a filter media that is less expensive, more efficient, and more durable than media made from microporous membranes or treated meltblown, but that possesses similar regenerative properties.

BRIEF SUMMARY OF THE INVENTION

In accordance with the present invention, there is provided a pleatable composite filter media that preferably has a supporting layer, a dust-releasing layer, and a filtering layer. The supporting layer is preferably formed of spun-bond non-woven synthetic fibers, but can be any gas-permeable material selected to have properties of stiffness and/or strength to provide the composite media with support, including wet-laid, air-laid and nettings.

The dust-releasing layer is formed of netting that is preferably made from polypropylene, although other materials having sufficiently low surface free energy can also be used. For example, surface energy in the range of 25 to 28 mN/m or less is considered sufficiently low for the purposes of this invention. The netting is laminated to the upstream surface of the supporting layer, preferably by hot calendering, which smoothes the dust-receiving surface of the dust-receiving layer.

The filtering layer is preferably formed of non-woven synthetic fibers and is laminated to the downstream surface of the supporting layer. The filtering layer is preferably made from electrostatically charged polypropylene melt-blown or spun-bond fibers, but can be made from any electrostatically charged or uncharged material selected to have specific filtration characteristics or properties of stiffness or strength.

The media constructed according to the present invention may possess a wide range of filtration efficiencies including high efficiency filtration (e.g., HEPA), which is considered by those skilled in the art to meet the efficiency standard of 99.97 percent removal of 0.3 μm particles.

Therefore, it is an aspect of the present invention to provide a particulate filter media of a composite construction wherein two or more layers are laminated together to possess excellent filtration efficiency characteristics, low pressure drop, high durability, and high regeneration capability. The media can be used to make vacuum cleaner filters and filters for portable air cleaners and other devices. In such devices, the ability to regenerate the filter by removing the particles, such as by shaking, tapping and/or vacuuming, is desirable so that the filter can be re-used.

It is another aspect of the present invention to provide a composite filter media of the type described which employs relatively low cost raw materials and can be economically manufactured compared to prior microporous membrane or treated melt-blown filter media.

Figure 1:
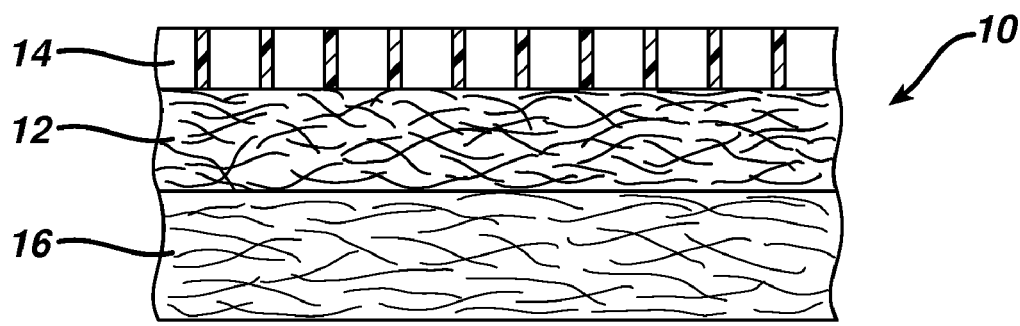
FIG. 1 is a cross-section schematic view illustrating a preferred embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 2:
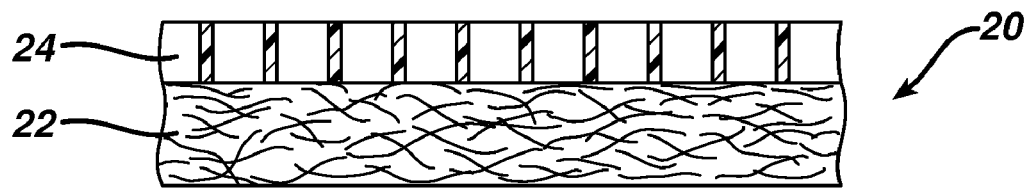
FIG. 2 is a cross-section schematic view illustrating a first alternative embodiment of the present invention.
Figure 3:
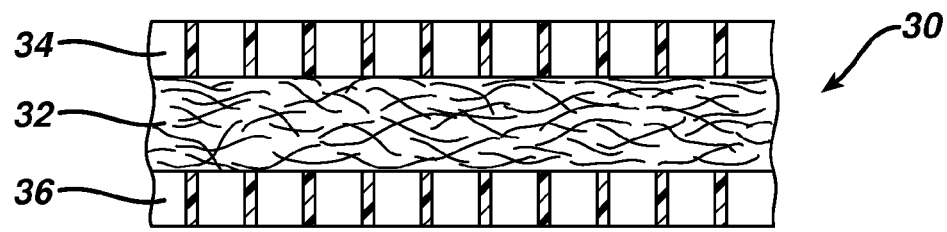
FIG. 3 is cross-section schematic view illustrating a second alternative embodiment of the present invention.

Referring to FIG. 1, the preferred filter medium 10 has a supporting layer 12, a dust-releasing layer 14, and a filtering layer 16 laminated in an overlaying relationship to one another. The relative thicknesses of the layers in FIGS. 1-3 are exaggerated for illustrative purposes. The supporting layer 12 is preferably formed of spun-bond polyester fibers, although other materials that are known to be suitable alternatives, such as polypropylene and nylon, are contemplated. Other suitable manufacturing processes, such as wet-laying and air-laying, are also contemplated. The supporting layer 12 is incorporated primarily to provide the filter medium 10 with added rigidity when required, particularly in the preferred pleated form. Thus, any gas-permeable material that provides sufficient rigidity can be used. To achieve an adequate level of rigidity, the preferred supporting layer 12 has a density in the range of approximately 80 to 200 grams per square meter.

The dust-releasing layer 14 is preferably formed of polypropylene netting and has an open area that is in the range of approximately 25% to 75%, and preferably between 40% and 60%, of the total area of the material. The preferred netting has a thickness in the range of approximately 75 micrometers to 250 micrometers, preferably between 100 micrometers and 150 micrometers, and a basis weight in the range of 10 to 30 grams per square meter. The preferred netting has between about 500 and about 900 voids per square inch, but variations from this opening density are contemplated.

For the purposes of the invention, "net" and "netting" are defined herein as an array of transverse strands formed in a grid-like structure, in which one row of substantially parallel strands intersects another row of substantially parallel strands, thereby forming openings. The intersections of strands forms knots, loops, simple overlaps or integral connections between strands. Each strand in each row is substantially equally spaced from next adjacent strands in the same row, thereby forming openings that are substantially the same size throughout the net. Although strands in a net can intersect at close to ninety degrees, this is not required.

Although it is preferred that the dust-releasing layer 14 be formed of polypropylene, it is contemplated that other materials having sufficiently low surface free energy may also be used, including, without limitation, high density polyethylene (HDPE), nylon, polyester and any member of polyolefin family. Sufficiently low surface free energy is in a range between about 25 to about 28 mN/m or less. Additives, such as fluorochemicals, can be added to the netting material to decrease surface energy and improve the dust-releasing capability, as is known by those skilled in the art, thereby permitting materials not listed herein to be used. The pressure drop and dust-releasing properties of the filter can be varied by varying the properties of the dust-releasing layer 14.

The dust-releasing layer 14 is hot calendered to the upstream surface of the supporting layer 12 in a conventional manner to bond the layer 14 to the layer 12. The temperature of the calender rolls during the calendering process depends on the netting material and is generally in the range of approximately 150 degrees F. to 325 degrees F. It is contemplated that the netting can be coated with a low temperature melting polymer, such as ethyl vinyl acetate (EVA), to reduce the required temperature of the calender rolls.

The polypropylene netting is smoothed during calendering, which, along with the inherently low surface free energy of the material, significantly enhances the dust-releasing properties of the filter medium 10. Additionally, the holes in the netting can be reduced in size during calendering. Thus, particulate matter retained by the upstream surface of the dust-releasing layer 14 remains loosely adhered to the netting, thereby making removal a simple step. This increased dust-releasing property provides for enhanced regeneration of the filter medium 10 after a period of use for maintaining desirable levels of filtration efficiency and pressure drop across the medium 10.

The regeneration of filter effectiveness and desired pressure drop is possible because the dust-releasing layer 14 is designed to trap the larger particle sizes on its upstream face. As these larger particles build up on the face of the dust-releasing layer 14, the pressure drop across the medium 10 increases. However, because these larger particles remain loosely adhered, they can be removed from the filter medium 10 by manually shaking and/or tapping the filter unit's frame against a solid surface, or by vacuuming the upstream surface of the dust-releasing layer 14. The larger particles are prevented from becoming trapped within the supporting layer 12 or the filtering layer 16 (discussed in greater detail below). Without the dust-releasing layer 14, premature loading of the layers 12 and 16 would occur and a shorter useful lifespan of the filter medium 10 would result. Because the supporting layer 12 and the filtering layer 16 are reserved for trapping the smaller particles in the incoming air flow, regeneration as noted above enables the filter medium 10 to provide a longer useful lifespan compared to typical filter media that do not possess similar composite construction and dust-release properties.

The filtering layer 16 is formed of melt-blown, non-woven synthetic fibers, such as polypropylene, that can be cold calendered to reduce the layer's thickness. A range of thicknesses of these fibers is 1 to 10 micrometers, and preferably 2 to 6 micrometers. It is contemplated that other non-woven synthetic fibers, such as polyester and nylon, can be used. Other manufacturing processes, such as wet-laying and air-laying, are also contemplated. The layer 16 is incorporated primarily for enhancing the filtration efficiency of the filter medium 10, but can additionally or alternatively be incorporated for adding strength or rigidity to the medium 10. The filtering layer 16 is laminated to the downstream surface of the supporting layer 12 in a conventional manner, such as by the application of adhesives or by thermal or ultrasonic point bonding. It is contemplated that the filter layer 16 may alternatively be laminated between the dust-releasing layer 14 and the supporting layer 12.

The filtering layer 16 is preferably electrostatically charged so that higher filtration efficiencies may be realized at lower pressure drops. The electrostatic charge may be applied using any suitable conventional and well-known process. For lower efficiency performance, the filtering layer 16 need not be electrostatically charged.

The preferred density of the filtering layer 16 may vary widely depending upon the required efficiency of a particular filter application and the degree of electrostatic charge applied. For example, the density of the filtering layer 16 may be in the range of 15 grams per square meter to 80 grams per square meter generally, and more preferably 25 grams per square meter to 70 grams per square meter for high end and HEPA efficiency applications.

The typical parameters of a composite filter media constructed according to the present invention are listed below. Material performance can be controlled by the amount of melt-blown fibers used, the characteristics of the netting used, the degree of electrostatic charge applied, and the type of supporting layer used:

|  | Test Method | Range |
| --- | --- | --- |
| Basis weight | TAPPI T410 | 120-220 g/m$^2$ |
| Thickness | TAPPI T411 | 0.3-0.8 mm? |
| Air Permeability | TAPPI T251 | 30-100 cfm/ft$^2$ |
| NaCl Penetration @10.5 fpm | TSI 8130 | 0.03-20% |
| Pressure Drop @10.5 fpm | TSI 8130 | 1.5-5.0 mm H$_2$O |

Embodiments of a composite filter medium made according to the invention are contemplated. Some alternatives incorporate additional electrostatically charged or uncharged layers of supporting or filtering material, laminated in a conventional manner downstream of a dust-releasing layer, for accommodating a variety of application requirements. In one alternative embodiment of the present invention, shown in FIG. 2, the composite filter medium 20 has a supporting layer 22 and a dust-releasing layer 24 similar to those described above. In the absence of a filtering layer, the supporting layer 22 may be electrostatically charged or selected to have a higher density for achieving desired levels of filtration efficiency.

In another alternative embodiment of the invention shown in FIG. 3, the filter medium 30 has a filtering layer 32 similar to the filtering layer 16 described above. The dust-releasing layers 34 and 36, which are similar to the dust-releasing layers 14 and 24 described above, are cold or hot calendered to the upstream surface and the downstream surface of the filtering layer 32. The layers 34 and 36 have thicknesses in the range of 0.1 mm to 0.75 mm, preferably in the range of 0.25 mm to 0.5 mm.

The filtering layer 32 is electrostatically charged, although such charging may be omitted to reduce cost. One side of the filtering layer 32 can be slightly calendered to provide a smooth surface. It is further contemplated that a supporting layer, similar to the supporting layer 12 described above, can be laminated between the filtering layer 32 and at least one of the dust-releasing layers 34 and 36. The filter medium 30 can be pleated after the layers 34 and 36 are laminated to the layer 32, or the layer 32 can be pleated alone. This alternative shows that layers of plastic netting or synthetic non-woven material can be added to any layer to increase stiffness or for other reasons, such as increased filtration.

Figure 4:
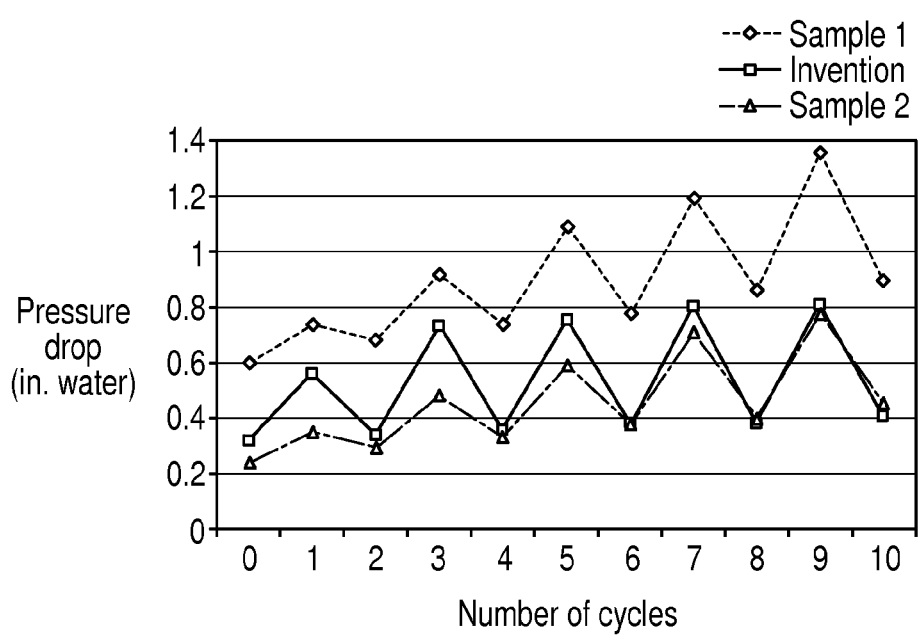
FIG. 4 is a graph comparing performance characteristics of a filter constructed in accordance with the present invention with two prior art filters having regenerative properties.

Referring now to FIG. 4, the graph illustrates a comparison of the regeneration characteristics of three filter media. The designation "Invention" represents a sample filter made with filter medium constructed in accordance with the present invention consisting of HDPE netting coated with Surlyn that was hot calendered to a supporting layer of polyester spunbond material. A filtering layer of electrostatically enhanced melt-blown polypropylene fibers was laminated to the downstream surface of the supporting layer. All layers were ultrasonically bonded together. This sample was constructed under the below-listed parameters.

|  | Test Method | Range |
|---|---|---|
| Basis weight | TAPPI T410 | 170-190 g/m$^2$ |
| Thickness | TAPPI T411 | 0.7-0.8 mm |
| Air Permeability | TAPPI T251 | 50-70 cfm/ft$^2$ |
| NaCl Penetration @10.5 fpm | TSI 8130 | 3.0-8.0% |
| Pressure Drop @10.5 fpm | TSI 8130 | 2.2-3.0 mm H$_2$O |

The designation "Sample 2" in FIG. 4 represents a sample of filter made with a composite filter medium similar to the medium made in accordance with U.S. Patent Pub. No. 2006/0060085 to Ptak et al., which is incorporated herein by reference. The designation "Sample 1" represents a sample of a filter media consisting of a layer of meltblown co-pleated with two plastic nettings.

Each filter sample was challenged with a specified amount of standard test dust (ISO 12103 Fine) under simulated conditions at a specified flow rate of 60 cfm. After each dust loading and measurement of pressure drop, each test specimen was removed from the test duct and the dust-loaded upstream surface of the specimen was cleaned with a vacuum cleaner having a brush attachment. All samples were cleaned with the same vacuum cleaner and brush, and in the same manner. After each cleaning cycle was completed the next dust loading cycle began, continuing until 5 cycles were completed.

The increase in filter pressure drop indicates the ability of the filters to be regenerated, with a smaller number indicating better regeneration. The increase in filter pressure drop equals the initial filter pressure drop subtracted from the final filter pressure drop after the number of regeneration cycles, which in this case was 5. The tests show that the inventive filter (pressure drop increase of 0.09 inches of water) had much better regeneration properties than the Sample 1 filter (pressure drop increase of 0.30) and, after completion of the fifth cycle, surpasses the regeneration properties of the Sample 2 filter (pressure drop increase of 0.21). This example is particularly impressive when the cost of materials and labor necessary to construct the filter media made in accordance with the present invention is compared to the significantly higher cost associated with the manufacture of the other filter media.

In an alternative embodiment of the invention, the netting layer described herein can have a dye incorporated therein, or added thereto, in order to color the netting layer. Of course, if there are multiple netting layers, one or more of the layers can have this dye incorporated therein. Additionally, an antimicrobial agent can also be incorporated into the netting layer or layers, or coated thereon, as can an additive that causes the media to be scented. These alternatives can be incorporated alone or in any combination as will be understood by the person having ordinary skill in the art.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. A composite air filter media comprising, in combination:
   a. at least one layer of gas-permeable supportive material formed from a plurality of bonded fibers, the supportive layer having an upstream surface and a downstream surface;
   b. a layer of netting formed of low surface free energy material bonded to the upstream surface of said at least one layer of gas-permeable supportive material, thereby forming a particulate-releasing surface for receiving particulate matter initially impacting the composite air filter media and subsequently releasing at least a significant portion of the particulate matter from the composite air filter media, wherein the thickness of the netting is in a range of about 75 micrometers to about 250 micrometers; and
   c. at least one layer of gas-permeable filtration material formed from a plurality of bonded fibers, the filtration layer bonded to the downstream surface of said at least one layer of supportive material.

2. The composite air filter in accordance with claim 1, wherein said at least one layer of gas-permeable supportive material is formed of nonwoven synthetic fibers.

3. The composite air filter in accordance with claim 2, wherein said at least one layer of gas-permeable supportive material is manufactured using a process taken from the group consisting of air laid, wet laid, spunbond and meltblown.

4. The composite air filter in accordance with claim 1, wherein the netting is laminated to the supportive layer by a hot calendering process.

5. The composite air filter in accordance with claim 1, wherein the netting is formed of polyolefin.

6. The composite air filter in accordance with claim 5, wherein the netting is formed of polypropylene.

7. The composite air filter in accordance with claim 5, wherein the netting is formed of high density polyethylene.

8. The composite air filter in accordance with claim 5, wherein the netting includes fluorochemical additives.

9. The composite air filter in accordance with claim 1, wherein the netting is treated with a hydrophobic material for enhancing the dust-releasing properties of the netting.

10. The composite air filter in accordance with claim 1, wherein the netting has an open area in a range of about 25% to about 75% of the total area of the netting.

11. The composite air filter in accordance with claim 10, wherein the netting has an open area in a range of about 40% to about 60% of the total area of the netting.

12. The composite air filter in accordance with claim 1, wherein the thickness of the netting is in a range of about 100 micrometers to about 150 micrometers.

13. The composite air filter in accordance with claim 1, wherein the basis weight of the netting is in a range of about 10 grams per square meter to about 30 grams per square meter.

14. The composite air filter in accordance with claim 1, wherein said layer of filter material is formed of nonwoven synthetic fibers.

15. The composite air filter in accordance with claim 14, wherein said layer of filter material comprises melt-blown synthetic fibers taken from the group consisting of polypropylene, polyester and nylon.

16. The composite air filter in accordance with claim 15, wherein said at least one layer of filter material is electrostatically charged.

17. A composite air filter media comprising, in combination:
   a. at least one layer of gas-permeable filter material formed from a plurality of bonded fibers, the filter layer having an upstream surface and a downstream surface;
   b. a first layer of netting formed of low surface free energy material that is bonded to the upstream surface of said at least one layer of filter material, thereby forming a particulate-releasing surface for receiving particulate matter initially impacting the composite air filter media and subsequently releasing at least a significant portion of the particulate matter from the composite air filter media; and
   c. a second layer of netting formed of low surface free energy material that is laminated to the downstream surface of said at least one layer of filter material;
   wherein the thickness of each layer of netting is in a range of about 75 micrometers to about 250 micrometers.

18. The composite air filter in accordance with claim 17, wherein said at least one layer of gas-permeable filter material comprises melt-blown synthetic fibers taken from the group consisting of polypropylene, polyester and nylon.

19. The composite air filter in accordance with claim 17, wherein at least one of the layers of netting is formed of polypropylene.

20. The composite air filter in accordance with claim 17, wherein at least one of the layers of netting is formed of high density polyethylene.

21. The composite air filter in accordance with claim 17, wherein at least one layer of gas-permeable supportive material is laminated between said at least one layer of gas-permeable filter material and at least one of the layers of netting.

22. The composite air filter in accordance with claim 21, wherein said at least one layer of gas-permeable supportive material is formed of nonwoven synthetic fibers.

23. The composite air filter in accordance with claim 22, wherein said at least one layer of gas-permeable supportive material is manufactured using a process taken from the group consisting of air laid, wet laid, spunbond and melt-blown.

24. The composite air filter in accordance with claim 17, wherein said at least one layer of filter material is electrostatically charged.

25. The composite air filter in accordance with claim 17, wherein at least one of the layers of netting includes a dye that colors the layer of netting.

26. The composite air filter in accordance with claim 17, wherein at least one of the layers of netting includes an antimicrobial agent.

27. The composite air filter in accordance with claim 17, wherein at least one of the layers of netting includes a scented additive.

28. A method of forming a composite air filter media, the method comprising:
   a. forming a gas-permeable supportive layer from a plurality of bonded fibers, the supportive layer having an upstream surface and a downstream surface;
   b. bonding a netting formed of a low surface free energy material to the upstream surface of the supportive layer, thereby forming a particulate-releasing surface for receiving particulate matter initially impacting the composite air filter media and subsequently releasing at least a significant portion of the particulate matter from the composite air filter media, wherein the thickness of the netting is in a range of about 75 micrometers to about 250 micrometers; and
   c. bonding at least one layer of a gas-permeable filtration material to the downstream surface of said at least one layer of supportive material, the filtration layer formed from a plurality of bonded fibers.

29. The method in accordance with claim 28, wherein the step of bonding further comprises hot calendering the supportive layer to the netting layer, thereby forming the particulate-releasing upstream surface on the netting.

* * * * *